Oct. 2, 1923.

P. T. ROBIN 1,469,538

TRANSMISSION UNIT

Filed June 10, 1921     3 Sheets-Sheet 1

WITNESSES

INVENTOR
PHILIP T. ROBIN
BY
ATTORNEYS

Oct. 2, 1923.
P. T. ROBIN
1,469,538
TRANSMISSION UNIT
Filed June 10, 1921   3 Sheets-Sheet 2
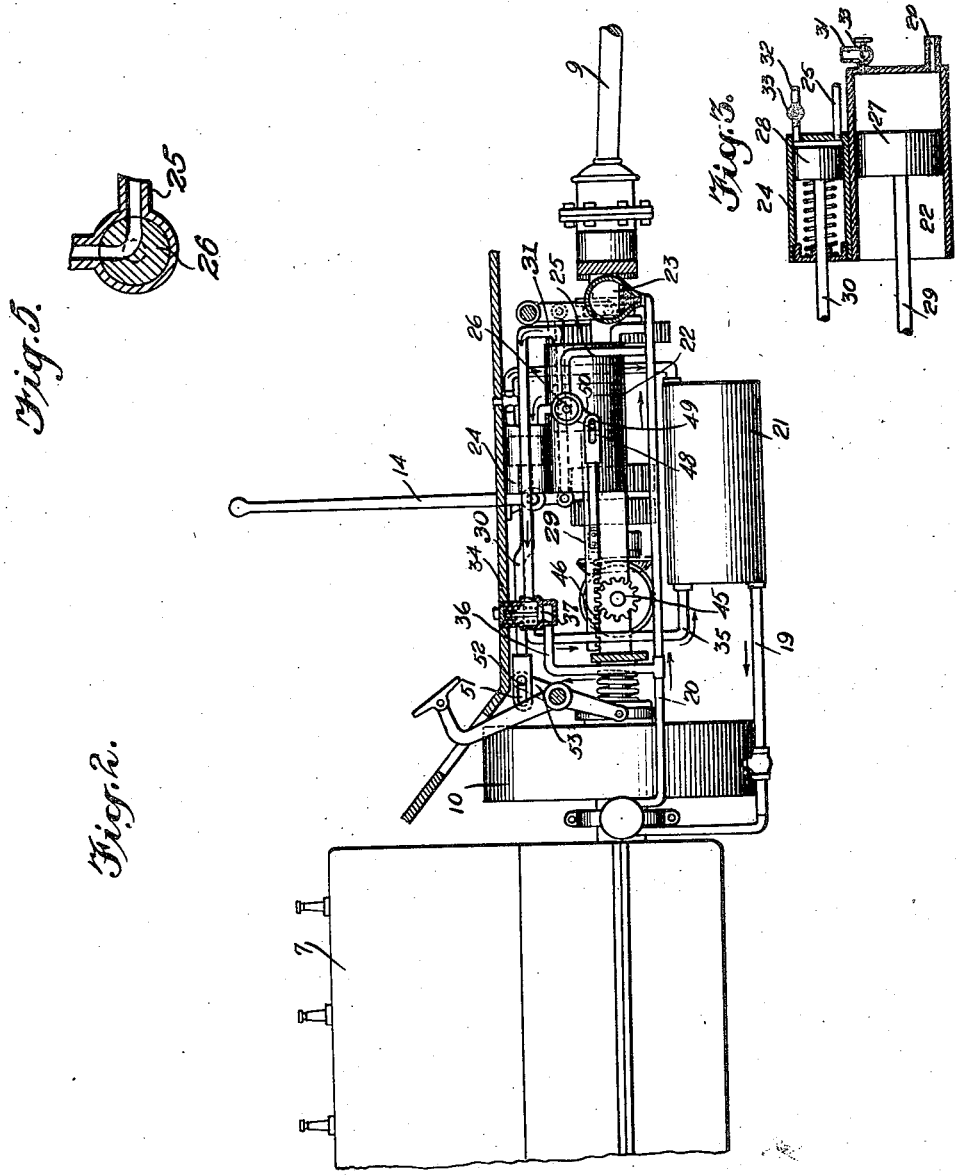
WITNESSES
INVENTOR
PHILIP T. ROBIN
BY
ATTORNEYS

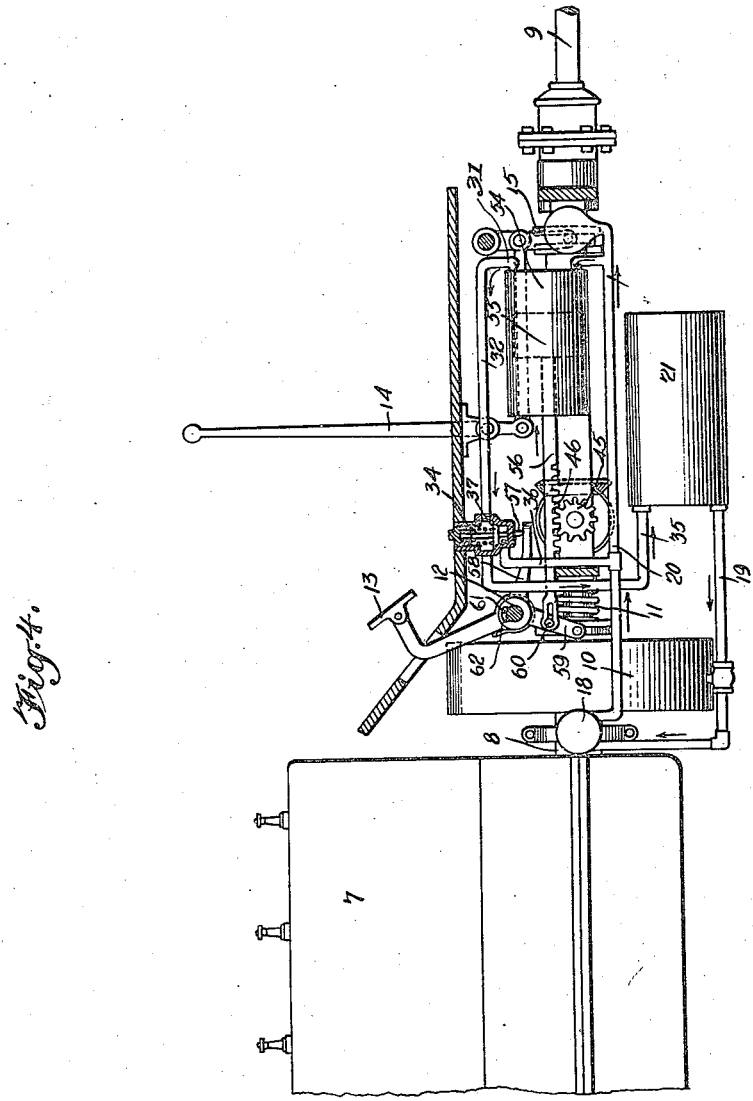

Patented Oct. 2, 1923.

1,469,538

UNITED STATES PATENT OFFICE.

PHILIP THEODORE ROBIN, OF NEW YORK, N. Y.

TRANSMISSION UNIT.

Application filed June 10, 1921. Serial No. 476,459.

*To all whom it may concern:*

Be it known that I, PHILIP T. ROBIN, subject of the King of England, and resident of the city of New York, borough of Bronx, county of Bronx, and State of New York, have invented a new and Improved Transmission Unit, of which the following is a full, clear, and exact description.

My invention relates to a transmission unit, and aims to provide a device of this character more particularly adapted for use in connection with the transmission of power from an engine to the driving wheels of a vehicle, although it is not necessary to limit it to this adaptation.

In connection with motor vehicles, which utilize an internal combustion engine, as their propelling medium, it is well understood that one of the paramount difficulties experienced is to be predicated to the transmission, and more particularly to the clutch and gear units thereof.

With these parts, an amateur driver experiences the greatest amount of trouble in that it is necessary, while the vehicle is moving to first disengage the clutch, second to close the throttle, third to shift gears, fourth to permit parts of the clutch to engage, and fifth to again open the throttle to the desired extent.

All of these operations must be undertaken each time the gears are shifted, and while the operator is steering the vehicle. Due to this, it is extremely difficult for most beginners to readily master the driving of a motor vehicle, and incident to improper operation the parts of the vehicle quite often become damaged or broken.

The difficulty experienced with these parts is not alone limited to inexperienced operators, but even with the best of drivers, it is found, particularly where a vehicle is overcoming a stiff gradient, and it becomes necessary to shift from higher to lower gears, that this shifting is resorted to, either too quickly or too late, in each instance resulting in a straining or even a breaking of the parts.

My present invention aims to overcome these difficulties in that I provide a transmission unit serving to impart rotation from a driving to a driven shaft, in such a manner that it will only be necessary, except in rare instances, to provide a gear shift having only a forward, reverse and neutral provision.

No operator experiences difficulty in a conventional motor driven vehicle, in placing the gear shift lever in the low speed or reverse position, while the vehicle is at a standstill. Thus by means of my improved unit, no difficulty will be experienced at all in that it will only be necessary for an operator to either shift into forward or reverse positions, subsequent to which the entire attention may be given to the steering of the vehicle, the manipulation of the throttle and actuation of the brake.

A further object of my invention is the construction of a device of the nature stated which shall be automatic in operation and which may be adjusted to a point at which no strains may possibly be imparted to the driving elements of the vehicle, such as are now experienced incident to the shifting of gears when the engine is under "load."

Another object of the invention is to utilize the rotative speed of an engine and the torque produced when starting a vehicle to derive two forces which coact to effect the operation of the clutch elements to a degree proportionate to the relation between said forces when one of them becomes relatively greater than the other.

With these and further objects in mind reference is had to the drawings illustrating practical embodiments of my invention, and in which;

Figure 2 is a partly sectional side view of the parts illustrated in Figure 1.

Figure 3 is an enlarged sectional view taken through certain of the parts illustrated in Figures 1 and 2.

Figure 4 is a view similar to Figure 2 but showing a slightly different arrangement of parts, and Figure 5 is a detail view of valve 26 shown in Figure 2.

Figure 1:
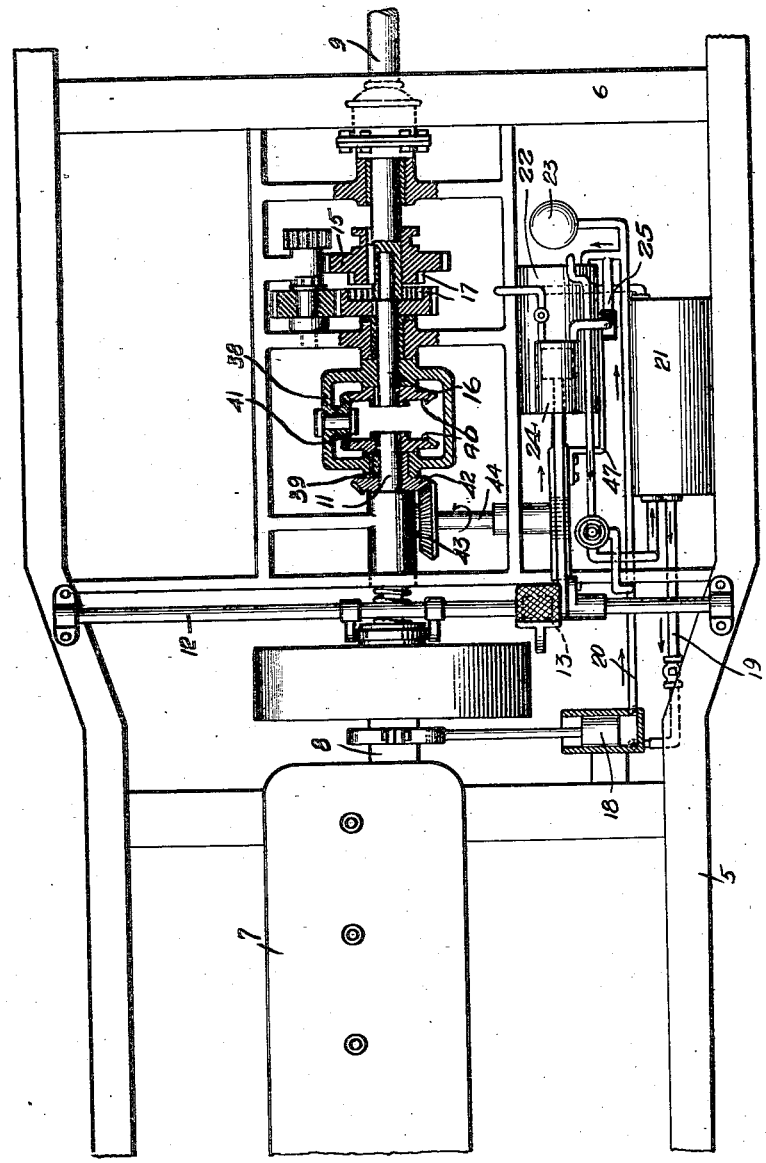
Figure 1 is a partly sectional plan view of a portion of a vehicle chassis and showing my improved transmission unit mounted thereon.

In these views it will be seen that the reference numeral 5 indicates the chassis side members between which the conventional cross braces 6 extend, the motor 7 being mounted upon the chassis and rotating a driving shaft 8 which, by means of mechanism hereinafter described imparts rotation to the propeller shaft 9.

Also in accordance with the conventional construction, a clutch 10 has certain of its parts associated with the driving shaft 8, while its other portions are secured to a shaft 11 forming a continuation of the driving shaft, a "throwing" of this clutch being effected in the embodiment illustrated by means of a rotatable shaft 12 connected to the retractable clutch parts, and a foot pedal 13 by means of which the clutch may be manually operated. Further a gear shift lever 14 is utilized by means of which gearing 15 may be actuated to either impart a reversal of the rotation of the propeller shaft 9 with respect to a supplemental shaft 16 introduced between the shaft 11 and the propeller shaft, or to couple these elements fixed with respect to each other, by means of a supplemental clutch 17 of any desirable construction and having its parts associated with these shafts.

Assuming that the shaft 16 is rotating it will thus be appreciated that by means of the gear shift lever 14 the propeller shaft 9 may either be caused to rotate opposed to the rotation of the supplemental shaft 16 thus backing the vehicle, or the propeller shaft 9 will be fixedly coupled to the supplemental shaft 16 and rotate with the same to move the vehicle forward.

Now with a view of providing means which will serve to produce the operation set forth in the statement of the object and nature of the invention of this specification, attention is invited to Figures 1 and 2. It will be seen in these views that the reference numeral 18 indicates a pump which is constantly operated by means of the driving shaft 8 when the motor 7 is running. Feeding and discharge pipes 19 and 20 are coupled to the pump 18, and the former pipe preferably has its opposite end connected to a storage tank 21 adapted to receive fluid. The feed pipe 20 extends rearwardly, and is connected to a cylinder 22, a pressure bulb 23 being preferably associated with the cylinder at this point to eliminate spasmodic increases and decreases in the pressure within the cylinder, incident to the action of the pump 18. A supplemental cylinder 24 is connected to the pressure pipe 20 by means of a branch pipe 25 tapping the said pressure pipe at a point in advance of its point of connection with the cylinder 22 and, a valve 26 is interposed within the branch pipe 25 and serves to control the flow of fluid through the same.

Attention is now invited to Fig. 3, which illustrates the cylinders 22 and 24 in section, and it will be seen in this view that pistons 27 and 28 respectively are slidably positioned within each of the cylinders, and carry one end of connecting rods 29 and 30 respectively. Further it will be noted that the pressure lines constituted by the pipe 20 and the branch pipe 25 thereof are greater in cross sectional area at their discharge ends than the exhaust pipes 31 and 32 respectively, which are connected to the cylinders, it being seen in this connection that suitable valves 33 may be interposed within its exhaust lines, whereby the flow of fluid therethrough may be adjusted to the finest possible extent. Thus, assuming that the pump 18 is discharging fluid at a relatively great rate, this fluid will enter both cylinders, conceding that the valve 26 is open, and the rate of entry of the fluid into these cylinders will be greater than the rate of discharge therefrom, incident to the restricted outlets presented by the discharge pipes 31 and 32. This will result in a "building up" of pressure within each of the cylinders, and consequential projection of the pistons 27 and 28 for a purpose hereinafter brought out.

The discharge pipe 32 of the cylinder 24 returns directly to the tank 21 in the embodiment illustrated while the discharge pipe 31 of the cylinder 22 is connected to a housing 34 from which the fluid normally flows directly to the tank 21 by means of a further pipe 35 extending between and connected to the said tank and housing 34. Also a branch pipe 36 is connected to the housing 34 and the pressure pipe 20 but a flow through this latter pipe is normally prevented by virtue of the fact that a check valve 37 is positioned within the housing 34.

Referring to Figure 1 it will be noted that the supplemental shaft 16 rotatably carries a cage 38 which latter in turn is keyed as at 39 to the gear 42. Both the shafts 11 and 16 have secured to their ends suitable gears 40 and a connection between these shafts is established by virtue of the fact that the cage 38 rotatably carries a gear 41 extending between and engaging both of the gears 40. Fixedly carried by the cage 38 is a gear 42, and this latter member is in engagement with a secondary gear 43 connected to a transverse shaft 44 having its outer end terminating at a point adjacent the connecting rod 29 of the cylinder 22, and carrying a gear 45, at this point, which gear engages teeth forming a rack 46, these teeth forming a part of the connecting rod 29.

A bracket 47 is also carried by the connecting rod 29, and this bracket has its outer end formed with a slot 48 within which rides a pin 49 carried by the arm 50 by means of which the valve 26 may be actuated. The connecting rod 30 also has a longitudinal slot 51 formed in its outer end, and a pin 52 extends within this slot, this pin being carried by an arm 53 secured to the clutch actuating shaft 12.

In operation it will be seen that the motor 7 will actuate the pump 18 which latter will pump a flow of oil (the fluid which I preferably utilize in the system) from the tank 21 through the pipe 19 into the pipe 20 and thence into the cylinder 22 from whence it will escape back into the tank 21 through the exhaust pipe 31, it being noted, however that the piston 27 will be projected thus retaining the valve 26 in closed position by virtue of the bracket 47 extending between and secured to the connecting rod 29, and the operating handle of the valve 26. If the gear shift lever 14 is now actuated to engage the clutch parts 17 or to otherwise connect the supplemental shaft 16 with the propeller shaft 9, subsequent to the clutch being manually thrown it will be understood that the shaft 11 will turn incident to the fact that the clutch 10 has its parts in frictional engagement, after the clutch pedal 13 is released.

This rotation of the shaft 11 will result in a corresponding rotation of the gear 40, which by means of the gear 41 carried by the cage 38 will strive to turn the second gear 40 secured to the supplemental shaft 16. Due to the fact that this shaft is now coupled to the propeller shaft 9, and the parts connected to this latter member are at a standstill, the usual starting torque will be encountered, and the shaft 9 will consequently tend to remain stationary, thus preventing a movement of the gear 40 secured to the shaft 16. When this occurs, the gear 41 and consequently the cage 38 will tend to climb around the gear 40 and this will obviously result in a rotation of the shaft 44 by means of the gearing 42 and 43. A rotation of the shaft 44 will cause the piston 27 to be retracted, due to the engagement between the gear 45 and the rack 46 of the connecting rod 29 which is secured to this piston. Immediately upon this occurring, the valve 26 will be opened by the bracket 47, and oil will be permitted to flow under pressure from the pressure line 20 through the branch pipe 25 and so into the cylinder 24 the piston of which latter will now be projected.

It should be understood that all of the operations aforedescribed will be virtually instantaneous although following in proper sequence, and upon the fluid flowing into the cylinder 24 the piston 28 therein will be projected, and by virtue of the engagement existent between the connecting rod 30 of this piston, and the clutch actuating shaft 12, the clutch 10 will be partially thrown.

As in the usual operation, the operator will now accelerate the speed of the motor 7, and this acceleration will immediately result in an increase of pressure within the pipe 20 by virtue of the faster operation of the pump 18. This increase in pressure will cause the piston 27 and connecting rod 29 to be projected against the retracting tendency of the gear 45, and this in turn will result in a partial closing of the valve 26 permitting the parts of the clutch 10 to engage slightly, and thus causing a rotation to be imparted to the propeller shaft 9 by the driving shaft 8, moving the vehicle forward. As the motor 7 again picks up speed, the pressure within the line 20 will again be increased and the connecting rod 29 will be still more projected, resulting in a further closing of the valve 26, which closing will gradually become complete, thus allowing the parts of the clutch 10 to engage completely and resulting in a direct driving of the propeller shaft 9 by the motor 7.

Assuming that the vehicle is being driven at a high rate of speed, it will be obvious that the pressure generated by the pump 18 might become excessive, and for this reason the check valve 37 is preferably utilized, it being noted in this connection that the latter may be regulated to a point at which, upon pressure becoming excessive the valve will unseat and permit the flow of oil through the branch pipe 36 directly into the pipe 20 and so into the tank 21, thus "bleeding" the system. Furthermore again assuming that the vehicle is moving forward at a relatively high rate of speed, and that sand or a hill are encountered, it will be noted that by virtue of the slot 48 the clutch 10 will not be materially "slipped." Thus upon the hill, sand or other resistance being encountered, the cage 38 will operate as has been aforedescribed, but this initial operation will only result in the bracket 47 slidably engaging the pin 49 thus preventing an opening of the valve 26 and an actuation of the clutch 10, unless the strain is continued over a lengthy period, in which event the gear 45 will move the connecting rod 29 still further rearwardly, and open the valve 26 to produce the operation described in preceding paragraphs, and thus relieve the strain upon the motor. It will be seen by virtue of this construction that the clutch will not be thrown every time a short space of sand or a short hill are encountered, but this will occur only upon the motor slowing down.

I have discovered that the "slipping" of a motor clutch may be undertaken without any damage resulting to the same, but if my system is utilized, a slightly larger type of clutch may form a constant part of the vehicle, so as to overcome any difficulties in this connection. Thus all of the objects set forth in the statement of the object and nature of the invention of this specification are accomplished, it being also noted that any jarring start, incident to an abrupt engagement of the clutch parts is precluded, and further that the strain upon the motor may be always adjusted to relieve the strain at a point at which this is necessary, the parts being again engaged exactly when the motor has developed the proper amount of power for this to occur.

Referring now more particularly to the structure illustrated in Figure 4 it will be seen that, as in the preceding views, the reference numerals 7 to 21 indicate the parts aforereferred to. Further it will be noted that the cylinder 54 has mounted within it a piston 55, to which one end of a connecting rod 56 is secured, this connecting rod in this instance, not controlling any valve, but being provided with the same type of rack 46 connecting with the gear 45 actuated by and controlling the same mechanism as has been described in connection with the structure illustrated in Figures 1 to 3.

Also in accordance with the structure aforedescribed, a return pipe 32 provided with a constricted end is attached to the cylinder 54, and a check valve 37 is connected to the opposite end of this pipe. Further a return pipe 35 is provided, but upon the check valve 37 operating the fluid will flow, as in the preceding type through the by-pass pipe 36 provided for this purpose.

Again diverging from the preceding type of drive it will be noted that the check valve 37 is preferably provided with a stem 57 extending beyond the housing 34, and it will be seen that this stem may be contracted by an extension 58 secured to the shaft 12 for a purpose hereinafter stated. Also the arm 59 secured to the shaft 12 mounts a pin 60 which extends through a longitudinal slot formed in the outer end of the connecting rod 56, thus associating these elements with each other, it being further noted that the shaft 12 has secured to it a pin 61 which rides within an arcuate slot 62 formed in the pedal 13 for a purpose hereinafter brought out.

Assuming again that the vehicle is at a standstill and that the gears have been meshed by means of the shift lever 14, and the pedal 13 released, it will be seen that the gear 45 will turn so as to retract the connecting rod 56 and consequently throw the clutch 10. When the speed of the engine becomes sufficient to accommodate the load thrown upon it, it will be obvious that the pressure within the cylinder 54 will increase incident to the quicker operation of the pump 18 and the restricted forward end of the pipe 32 thus projecting the piston 55 and the connecting rod 56, and engaging the clutch parts, this operation being continued until a "direct drive" exists from the driving shaft 8 to the propeller shaft 9. If sand or a hill is encountered, the gear 45 will throw the connecting rod 56 rearwardly, but this initial movement will not effect a disengagement of the clutch parts incident to the fact that the pin 60 will ride within the longitudinal slot of the connecting rod, thus preventing a throwing of the clutch parts, if but a slight hill or a short strip of sand or mud is encountered. If however, the relatively great torque continues, a retraction of the connecting rod 56 will become more complete, resulting in a throwing of the clutch parts. Assuming that the vehicle is moving at a great speed it will be appreciated that the check valve 37 will be actuated in the manner aforedescribed, so that the pressure upon the parts will be relieved. Also if the car is to be brought to a sudden stop this may be accomplished by virtue of the fact that the clutch pedal may be depressed and the clutch parts disengaged for the reason that the pin 60 may slide within the longitudinal slot of the connecting rod 56, thus not rendering it necessary for the operator to work against the pressure of the system and if this disengagement of the clutch parts is to be complete the extension 58 will co-operate with the stem 57 of the valve to "bleed" the entire system and thus eliminate any pressure.

Obviously numerous modifications of structure might readily be resorted to without in the least departing from the spirit of my invention, which I claim as:

1. A transmission unit including in combination, an explosive motor, a driving shaft coupled to said motor, a driven shaft, a clutch including a plurality of parts presenting driving and driven surfaces respectively, the driving parts of said clutch being coupled to said driving shaft, the driven parts of said clutch being secured to said driven shaft, means for normally engaging said clutch parts, torque actuated means coupled to said driven shaft, hydraulic means coupled to said driving shaft, and means connected to said torque and hydraulic means, and to said clutch parts to effect a disengagement of the driving and driven surfaces of the latter incident to the joint action of said hydraulic and torque means.

2. A transmission unit including in combination a driving shaft and a driven shaft, a friction clutch comprising a plurality of parts associated with adjacent ends of said driving and driven shafts, manual clutch operating means connected to said clutch, hydraulic means connected to said driving shaft, means connecting said hydraulic means to said clutch parts, and torque means associated with said driven shaft and co-operating with said clutch operating means whereby to vary the pressure between the engaging surfaces of said clutch in proportion to the resistance presented by said driven shaft.

3. A transmission unit including a driving shaft, a driven shaft, a mechanical friction clutch comprising a plurality of parts associated with adjacent ends of said driving and driven shafts, torque means connected to said driven shaft, hydraulic pressure means operated by said driving shaft, and means connected to said clutch, and to said hydraulic and torque means for effecting an automatic engagement and disengagement of said clutch parts.

4. A transmission unit including a driving shaft, a driven shaft, a clutch including a plurality of parts associated with adjacent ends of said shafts, torque means associated with one of said shafts, hydraulic pressure means associated with the second of said shafts, and means connected to said clutch parts, and to said hydraulic and torque means for effecting a degree of engagement and disengagement of the parts of said clutch in proportionate ratio to the speed developed by said driving shaft and the torque exerted upon said driven shaft, respectively.

5. A transmission unit including a driving shaft, a driven shaft, a clutch including a plurality of parts associated with adjacent ends of said shafts, a pump operatively connected to said driving shaft, torque means connected to said driven shaft, a clutch operating shaft, means for actuating said latter shaft to disengage and engage the parts of said clutch, and means connected to said shaft and also to said pump and torque means for actuating said shaft to cause a degree of engagement and disengagement of said clutch parts in proportionate ratio to the speed developed by said driving shaft, and torque exerted upon said driven shaft, respectively.

6. A transmission unit including a driving shaft, a driven shaft, a clutch including a plurality of parts associated with adjacent ends of said shafts, a pump operatively connected to said driving shaft, torque means connected to said driven shaft, a clutch operating shaft, means for actuating said latter shaft to disengage and engage the parts of said clutch, a cylinder connected to said pump, a piston movable within said cylinder, a rack connected to said piston, a shaft extending between and connecting said torque means and said rack whereby the pressure within said pump may counteract the torque action of said driven shaft, and means for connecting said clutch operating shaft with said rack.

7. A transmission unit including a driving shaft and a driven shaft, a clutch comprising a plurality of parts associated with adjacent ends of said shafts, a pump connected to said driving shaft, said driven shaft including a plurality of parts, a cage extending between the end portions of certain of said parts, gears secured to said driven shaft parts, a gear rotatably carried by said cage and engaging the teeth of said first named gears whereby to provide a torque actuated element, means responsive to the pressure developed by said pump, means for connecting said last named means with said cage, and further connecting means for connecting one of said clutch parts with said pressure responsive means.

8. A transmission unit including a driving shaft and a driven shaft, a clutch comprising a plurality of parts connected to said driving and driven shafts, torque means associated with said driven shaft, a pump operatively connected to said driving shaft, a cylinder, a piston within said cylinder, a rod connected to said piston, means extended between said rod and said clutch for transmitting motion from the former to the latter, a pipe connecting the discharge end of said pump with the intake end of said cylinder, an outlet pipe connected to said cylinder its opposite end being connected to the intake end of said pump, the outlet pipe of said cylinder being of a diameter more restricted than the intake passage thereof.

9. A transmission unit including a driving shaft and a driven shaft, a clutch interposed between the two shafts, a pump driven by the driving shaft, a reservoir connected to said pump, a pressure pipe extending between said pump and reservoir, a cylinder, a piston within said cylinder, a rod connected to said piston and to said clutch, and means connecting said rod to said driven shaft whereby said clutch is operated when the pressure within said cylinder increases due to an increasing load resistance on the driven shaft.

10. A transmission unit including a driving shaft and a driven shaft, a clutch comprising a plurality of parts connected to said driving and driven shafts, torque means associated with said driven shaft, a pump operatively connected to said driving shaft, a cylinder, a piston within said cylinder, a rod connected to said piston, a pipe connecting the discharge end of said pump with the intake end of said cylinder, an outlet pipe connected to said cylinder, its opposite end being connected to the intake end of said pump, a further pipe extending between said last named pipe and the pressure pipe of said pump, and a spring pressed valve normally preventing the flow of fluid through said last named pipe.

11. A transmission unit including a driving shaft, and a driven shaft, a clutch comprising a plurality of parts connected to said driving and driven shafts, torque means associated with said driven shaft, a pump operatively connected to said driving shaft, a cylinder, a piston within said cylinder, a rod connected to said piston, a pipe connecting the discharge end of said pump with the intake end of said cylinder, an outlet pipe connected to said cylinder, its opposite end being connected to the intake end of said pump, a further pipe extending between said last named pipe and the pressure pipe of said pump, and a valve for normally preventing the flow of fluid through said last named pipe.

12. A transmission unit including a driving shaft and a driven shaft, a clutch comprising a plurality of parts connected to said driving and driven shafts, torque means associated with said driven shaft, a pump operatively connected to said driving shaft, a cylinder, a piston within said cylinder, a rod connected to said piston and means for loosely connecting one of said clutch parts with said rod.

13. A transmission unit including a driving shaft, a driven shaft, a clutch including a plurality of parts associated with said shafts, means associated with said driving shaft for deriving a force from the rotation thereof proportionate to the rotative speed of the same, torque responsive means associated with one of said shafts for deriving a force from the torque transmitted by one of said shafts proportionate to said torque, and means associated with the first named means and torque responsive means for automatically operating said clutch parts to a degree proportionate to the relation between the forces derived from the first named means and the torque responsive means.

14. A transmission unit including a driving shaft, a driven shaft, a clutch including a plurality of parts associated with said shafts, means associated with said driving shaft for deriving a force from the rotation thereof proportionate to the rotative speed of the same, torque responsive means associated with one of said shafts for deriving a force from the torque transmitted by one of said shafts proportionate to said torque, and means associated with the first named means and torque responsive means for effecting an engagement of said clutch parts to a degree proportionate to the relation between said forces when the force derived by the first named means becomes relatively greater than that derived by said torque responsive means.

15. A transmission unit including a driving shaft, a driven shaft, a clutch including a plurality of parts associated with said shafts, means associated with said driving shaft for deriving a force from the rotation thereof proportionate to the rotative speed of the same, torque responsive means associated with one of said shafts for deriving a force from the torque transmitted by one of said shafts proportionate to said torque, and means associated with the first named means and torque responsive means for effecting a disengagement of said clutch parts to a degree proportionate to the relation between said forces when the force derived by said torque responsive means becomes relatively greater than that derived by the first named means.

16. A transmission unit including a driving shaft, a driven shaft, a clutch including a plurality of parts associated with said shafts, a hydraulic means including a pump operated by said driving shaft, a cylinder, a connection between said pump and cylinder having a restricted outlet through which a fluid is discharged from said pump into said cylinder to develop a force within the cylinder proportionate to the rotative speed of said driving shaft, torque means for transmitting torque to said clutch while simultaneously deriving from the torque a force proportionate to the same, means cooperating with said hydraulic means and torque means and responsive to the interaction of said fluid and torque forces, whereby each of said forces counteracts and tends to balance the action of the other, and means cooperating with the last two mentioned means and with said clutch for applying the resultant force produced when one of said forces becomes relatively greater than the other to effect an operation of said clutch parts to a degree proportionate to the relation between said hydraulic and torque forces.

PHILIP THEODORE ROBIN.